(12) United States Patent
Vendelbo et al.

(10) Patent No.: US 12,363,544 B2
(45) Date of Patent: *Jul. 15, 2025

(54) HEARING DEVICE SYSTEM, DEVICES AND METHOD OF CREATING A TRUSTED BOND BETWEEN A HEARING DEVICE AND A USER APPLICATION

(71) Applicant: GN Hearing A/S, Ballerup (DK)

(72) Inventors: Allan Munk Vendelbo, Valby (DK); Brian Dam Pedersen, Ringsted (DK)

(73) Assignee: GN HEARING A/S, Ballerup (DK)

( * ) Notice: Subject to any disclaimer, the term of this patent is extended or adjusted under 35 U.S.C. 154(b) by 461 days.

This patent is subject to a terminal disclaimer.

(21) Appl. No.: 17/670,375

(22) Filed: Feb. 11, 2022

(65) Prior Publication Data

US 2022/0167173 A1 May 26, 2022

Related U.S. Application Data

(63) Continuation of application No. 15/939,847, filed on Mar. 29, 2018, now Pat. No. 11,284,263.

(30) Foreign Application Priority Data

May 31, 2017 (EP) .................................. 17173675

(51) Int. Cl.
*H04W 12/50* (2021.01)
*G06F 21/60* (2013.01)
(Continued)

(52) U.S. Cl.
CPC .......... *H04W 12/50* (2021.01); *G06F 21/606* (2013.01); *H04L 9/0841* (2013.01);
(Continued)

(58) Field of Classification Search
CPC ..... H04W 12/06; H04W 12/50; G06F 21/606; H04L 9/3271; H04L 63/0492; H04L 63/0876; H04R 2225/55
See application file for complete search history.

(56) References Cited

U.S. PATENT DOCUMENTS

| 4,194,427 A | 3/1980 | Deutsch |
| 2004/0133789 A1 | 7/2004 | Gantman et al. |

(Continued)

FOREIGN PATENT DOCUMENTS

| CN | 102104870 | 6/2011 |
| CN | 102362509 | 2/2012 |

(Continued)

OTHER PUBLICATIONS

J. Liu, X. Ye, J. Zhang and J. Li, "Security Verification of 802.11i 4-Way Handshake Protocol," 2008 IEEE International Conference on Communications, Beijing, China, 2008, pp. 1642-1647, doi: 10.1109/ICC.2008.317. (Year: 2008).*

(Continued)

*Primary Examiner* — Robert B Leung
(74) *Attorney, Agent, or Firm* — Vista IP Law Group, LLP

(57) ABSTRACT

A method, performed by a user application, of creating a trusted bond between a hearing device and the user application is disclosed, wherein the method comprises obtaining first authentication material; transmitting a first authentication request comprising first authentication data to the hearing device; receiving a first authentication response comprising a sound signal from the hearing device; deriving second authentication material based on the sound signal; determining second authentication data based on the second authentication material; transmitting a second authentication request comprising the second authentication data to the hearing device; receiving a second authentication response (Continued)

comprising an authentication key identifier from the hearing device; storing an authentication key and the authentication key identifier, wherein the authentication key is based on the first authentication material; and connecting the user application to the hearing device using the authentication key and the authentication key identifier.

30 Claims, 5 Drawing Sheets

(51) Int. Cl.
*H04L 9/08* (2006.01)
*H04L 9/32* (2006.01)
*H04L 9/40* (2022.01)
*H04R 25/00* (2006.01)
*H04W 12/06* (2021.01)

(52) U.S. Cl.
CPC ........ *H04L 9/3271* (2013.01); *H04L 63/0492* (2013.01); *H04L 63/0876* (2013.01); *H04W 12/06* (2013.01); *H04L 63/18* (2013.01); *H04L 2209/88* (2013.01); *H04R 25/558* (2013.01); *H04R 2225/55* (2013.01)

(56) References Cited

U.S. PATENT DOCUMENTS

| | | |
|---|---|---|
| 2006/0053298 A1 | 3/2006 | Ingerman et al. |
| 2006/0126847 A1* | 6/2006 | Ho ................. H04L 63/065 380/277 |
| 2008/0102793 A1* | 5/2008 | Ananthanarayanan ................. H04W 12/06 455/411 |
| 2008/0195865 A1* | 8/2008 | Nikander ............ H04L 63/0442 713/170 |
| 2008/0268776 A1 | 10/2008 | Amendola |
| 2009/0217043 A1 | 8/2009 | Metke et al. |
| 2010/0110837 A1 | 5/2010 | Jung et al. |
| 2010/0227549 A1 | 9/2010 | Kozlay |
| 2011/0143715 A1 | 6/2011 | Labrador et al. |
| 2011/0150223 A1 | 6/2011 | Qi et al. |
| 2011/0217950 A1 | 9/2011 | Kozlay |
| 2012/0045994 A1 | 2/2012 | Koh et al. |
| 2012/0252414 A1 | 10/2012 | Ishidoshiro |
| 2015/0099470 A1* | 4/2015 | Lee .................. H04W 4/80 455/41.2 |
| 2015/0244912 A1* | 8/2015 | Chang ................ H04N 1/32117 348/211.2 |
| 2015/0318874 A1 | 11/2015 | Donaldson et al. |
| 2016/0050197 A1 | 2/2016 | Panging |
| 2016/0173462 A1 | 6/2016 | Pedersen et al. |
| 2016/0365932 A1 | 12/2016 | Carter et al. |
| 2017/0006029 A1 | 1/2017 | Pedersen et al. |
| 2017/0048613 A1* | 2/2017 | Smus .................. H04L 65/1069 |
| 2017/0071017 A1 | 3/2017 | Klemans et al. |

FOREIGN PATENT DOCUMENTS

| | | |
|---|---|---|
| CN | 106330856 | 1/2017 |
| EP | 3032857 | 6/2016 |

OTHER PUBLICATIONS

Final Office Action for U.S. Appl. No. 15/939,847 dated Aug. 23, 2021.
Final Office Action for U.S. Appl. No. 15/939,847 dated Oct. 19, 2020.
Non-Final Office Action for U.S. Appl. No. 15/939,847 dated Mar. 8, 2021.
Non-Final Office Action for U.S. Appl. No. 15/939,847 dated Feb. 18, 2020.
Notice of Allowance for U.S. Appl. No. 15/939,847 dated Nov. 19, 2021.
Foreign Office Action dated Nov. 22, 2017 for EP Appln. No. 17173675.4.
Foreign OA Chinese Patent Application No. 201810550224.8 dated Jul. 1, 2021.
Translation of Office Action dated Jul. 1, 2021 issued for Chinese Patent Application No. 201810550224.8.
W. R. Claycomb and D. Shin, "Secure device pairing using audio," 43rd Annual 2009 International Carnahan Conference on Security Technology, Zurich, Switzerland, 2009, pp. 77-84. (Year: 2009).
The Transport Layer Security (TLS) Protocol. Version 1.2, RFC 5246, Aug. 2008. (Year: 2008).
Jyh-Cheng Chen, Ming-Chia Jiang and Yi-wen Liu, "Wireless LAN security and IEEE 802.11 i," in IEEE Wireless Communications, vol. 12, No. 1, pp. 27-36, Feb. 2005. (Year: 2005).
Xiawen Xiao, Jie Ding and Nanrun Zhou, "An improved mechanism for four-way handshake procedure in IEEE802.11i," 2010 3rd International Conference on Computer Science and Information Technology, Chengdu, 2010, pp. 419-422. (Year: 2010).
IEEE Standard for information technology—Part 11—Amendment 6 in IEEE Std. 802.11 i-2004 (hereinafter, "IEEE"), pp. 1-190, Jul. 24, 2004. (Year: 2004).
He, Changhua and Mitchell, John C, "Analysis of the 802.11 i 4-Way Handshake," WISE '04, Oct. 2004. (Year: 2004).

* cited by examiner

HEARING DEVICE SYSTEM, DEVICES AND METHOD OF CREATING A TRUSTED BOND BETWEEN A HEARING DEVICE AND A USER APPLICATION

RELATED APPLICATION DATA

This application is a continuation of U.S. patent application Ser. No. 15/939,847 filed on Mar. 29, 2018, pending, which claims priority to, and the benefit of, European Patent Application No. EP 17173675.4 filed on May 31, 2017. The entire disclosures of the above applications are expressly incorporated by reference herein.

FIELD

The present disclosure relates to a hearing device system comprising a hearing device and a user accessory device. In particular, the present disclosure relates to methods and devices for creating a trusted bond between entities of a hearing device system.

BACKGROUND

Wireless communication to and from different entities of a hearing device system has been increasing in continuation of the developments of integrating wireless communication technology in hearing device systems. However, the new technologies entail new challenges for the hearing aid manufacturers in order to secure communication in a hearing device system. Wireless communication interfaces of a hearing device system desirably use an open standard-based interface. However, this poses many challenges in terms of security.

SUMMARY

There is a need for apparatus, devices and methods for providing easy, efficient, and secure pairing of a user application and a hearing device.

Accordingly, a method, performed by a user application, of creating a trusted bond between a hearing device and the user application is disclosed. The method comprises: obtaining first authentication material; transmitting a first authentication request comprising a first authentication type identifier and first authentication data to the hearing device; receiving a first authentication response comprising a sound signal from the hearing device; deriving second authentication material based on the sound signal; determining second authentication data based on the second authentication material; transmitting a second authentication request comprising the second authentication data to the hearing device; receiving a second authentication response comprising an authentication key identifier from the hearing device; storing an authentication key and the authentication key identifier, wherein the authentication key is based on the first authentication material; and connecting the user application to the hearing device using the authentication key and the authentication key identifier.

Further, a method, performed at a hearing device, of creating a trusted bond between the hearing device and a user application is disclosed. The method comprises: optionally transmitting security data of the hearing device, wherein the security data are indicative of an authentication type applied in the hearing device; transmitting first authentication material to the user application; receiving a first authentication request comprising a first authentication type identifier and/or first authentication data; verifying the first authentication data; transmitting to the user application a first authentication response comprising a sound signal; receiving from the user application a second authentication request comprising second authentication data; verifying the second authentication data; and if verifying the second authentication data is successful: determining and storing an authentication key and transmitting to the user application a second authentication response comprising an authentication key identifier indicative of the authentication key in the hearing device.

Also, a user application configured to perform methods performed by a user application described herein is provided. A hearing device configured to perform methods performed at a hearing device described herein is provided.

A user application for a user accessory device of a hearing device system comprising a hearing device is provided, the user accessory device comprising a processing unit; a memory unit; and an interface, wherein the user application when running on the user accessory device is configured to: obtain first authentication material; transmit a first authentication request comprising a first authentication type identifier and/or first authentication data to the hearing device; receive a first authentication response comprising a sound signal from the hearing device; derive second authentication material based on the sound signal; determine second authentication data based on the second authentication material; transmit a second authentication request comprising the second authentication data to the hearing device; receive from the hearing device a second authentication response comprising an authentication key identifier; store an authentication key and the authentication key identifier, wherein the authentication key is based on the first authentication material; and connect the user application to the hearing device using the authentication key and the authentication key identifier.

Even further, a hearing device is provided, the hearing device comprising: a processing unit; a memory unit; and an interface, wherein the hearing device is configured to: transmit security data of the hearing device to the user application, wherein the security data are indicative of an authentication type applied in the hearing device; transmit first authentication material to the user application; receive from the user application a first authentication request comprising a first authentication type identifier and first authentication data; verify the first authentication data; transmit to the user application a first authentication response comprising a sound signal; receive from the user application a second authentication request comprising second authentication data; verify the second authentication data; determine and storing an authentication key if verifying the second authentication data is successful; and transmit to the user application a second authentication response comprising an authentication key identifier indicative of the authentication key in the hearing device if verifying the second authentication data is successful.

It is an advantage of the present disclosure that a secure and easy pairing between a user application and a hearing device is provided, at least after an initial pairing. Further, the present disclosure allows for a plurality of ways to authenticate a user application towards a hearing device, in turn providing increased design freedom for a dispenser. In other words, the present disclosure provides the advantages of ease of use, increased level of security and reduced level of complexity.

The present methods, applications and devices enables a dispenser, the hearing device manufacturer and even the hearing device user to select a suitable initial method of creating a trusted bond (mutually authenticated key exchange-based trusted bond) from a plurality of ways in order to create a trusted bond between a hearing device and a user application.

It is an important advantage that the authentication key is not transmitted between the user application and the hearing device, which increases the security level in hearing device system communication.

A hearing device includes: a processing unit; a memory unit coupled to the processing unit; and an interface coupled to the processing unit; wherein the hearing device is configured to: transmit security data of the hearing device to a user device, wherein the security data is indicative of an authentication type; transmit first authentication material to the user device; receive from the user device a first authentication request comprising a first authentication type identifier and first authentication data; verify the first authentication data; and transmit to the user device a first authentication response, wherein the first authentication response comprises a sound signal.

Optionally, the hearing device is further configured to: receive from the user device a second authentication request comprising second authentication data; and verify the second authentication data.

Optionally, the hearing device is further configured to determine and storing an authentication key in the hearing device if the second authentication data is successfully verified.

Optionally, the hearing device is further configured to transmit to the user device a second authentication response comprising an authentication key identifier indicative of the authentication key in the hearing device if the second authentication data is successfully verified.

A method performed by a hearing device, includes: transmitting security data of the hearing device to a user device, wherein the security data is indicative of an authentication type; transmitting first authentication material to the user device; receiving from the user device a first authentication request comprising a first authentication type identifier and first authentication data; verifying the first authentication data; and transmitting to the user device a first authentication response; wherein the first authentication response comprises a sound signal.

Optionally, the method further includes: receiving from the user device a second authentication request comprising second authentication data; and verifying the second authentication data.

Optionally, the method further includes: determining and storing an authentication key in the hearing device if the second authentication data is successfully verified.

Optionally, the method further includes: transmitting to the user device a second authentication response if the second authentication data is successfully verified, the second authentication response comprising an authentication key identifier indicative of the authentication key in the hearing device.

Optionally, the sound signal comprises a random sound signal.

Optionally, the sound signal comprises one or more tones.

Optionally, the first authentication response is transmitted if the first authentication data is successfully verified.

A method of communication with a hearing device includes: obtaining, by a user device, first authentication material transmitted by the hearing device; transmitting a first authentication request comprising first authentication type identifier and first authentication data to the hearing device; receiving a first authentication response comprising a sound signal from the hearing device; deriving second authentication material based on the sound signal; determining second authentication data based on the second authentication material; and transmitting a second authentication request comprising the second authentication data to the hearing device.

Optionally, the first authentication material comprises a hearing device identifier and/or a first hearing device challenge value.

Optionally, the method further includes: determining a first common secret based on the first authentication material.

Optionally, the method further includes: determining an application session key; and calculating the first authentication data based on the application session key.

Optionally, the method further includes: receiving a second authentication response comprising an authentication key identifier from the hearing device; and storing an authentication key and the authentication key identifier, wherein the authentication key is based on the first authentication material.

Optionally, the method further includes: connecting the user device to the hearing device using the authentication key and the authentication key identifier.

Optionally, the method further includes: verifying the second authentication response; wherein the act of storing the authentication key and the authentication key identifier and/or the act of connecting the user device to the hearing device using the authentication key and the authentication key identifier is performed if the second authentication response is successfully verified.

Optionally, the method further includes: calculating the authentication key based on the first authentication material.

Optionally, the authentication key is based on the second authentication material.

Optionally, the method further includes: obtaining a public key of the hearing device, wherein the authentication key is based on the public key of the hearing device.

Optionally, the method further includes: obtaining security data from the hearing device, wherein the first authentication type identifier is based on the security data.

A product includes a set of instructions, an execution of which by a processing unit of a user device causes a method to be performed, the method comprising: obtaining first authentication material transmitted; transmitting a first authentication request comprising a first authentication type identifier and first authentication data to a hearing device; receiving a first authentication response comprising a sound signal from the hearing device; deriving second authentication material based on the sound signal; determining second authentication data based on the second authentication material; and transmitting a second authentication request comprising the second authentication data to the hearing device.

Optionally, the method further comprises: receiving a second authentication response comprising an authentication key identifier from the hearing device; and storing an authentication key and the authentication key identifier, wherein the authentication key is based on the first authentication material.

Optionally, the method further comprises connecting the user device to the hearing device using the authentication key and the authentication key identifier.

Optionally, the method further comprises verifying the second authentication response; wherein the act of storing the authentication key and the authentication key identifier and/or the act of connecting the user device to the hearing device using the authentication key and the authentication key identifier is performed if the second authentication response is successfully verified.

Optionally, the method further comprises calculating the authentication key based on the first authentication material.

Optionally, the authentication key is based on the second authentication material.

Optionally, the method further comprises obtaining a public key of the hearing device, wherein the authentication key is based on the public key of the hearing device.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1:
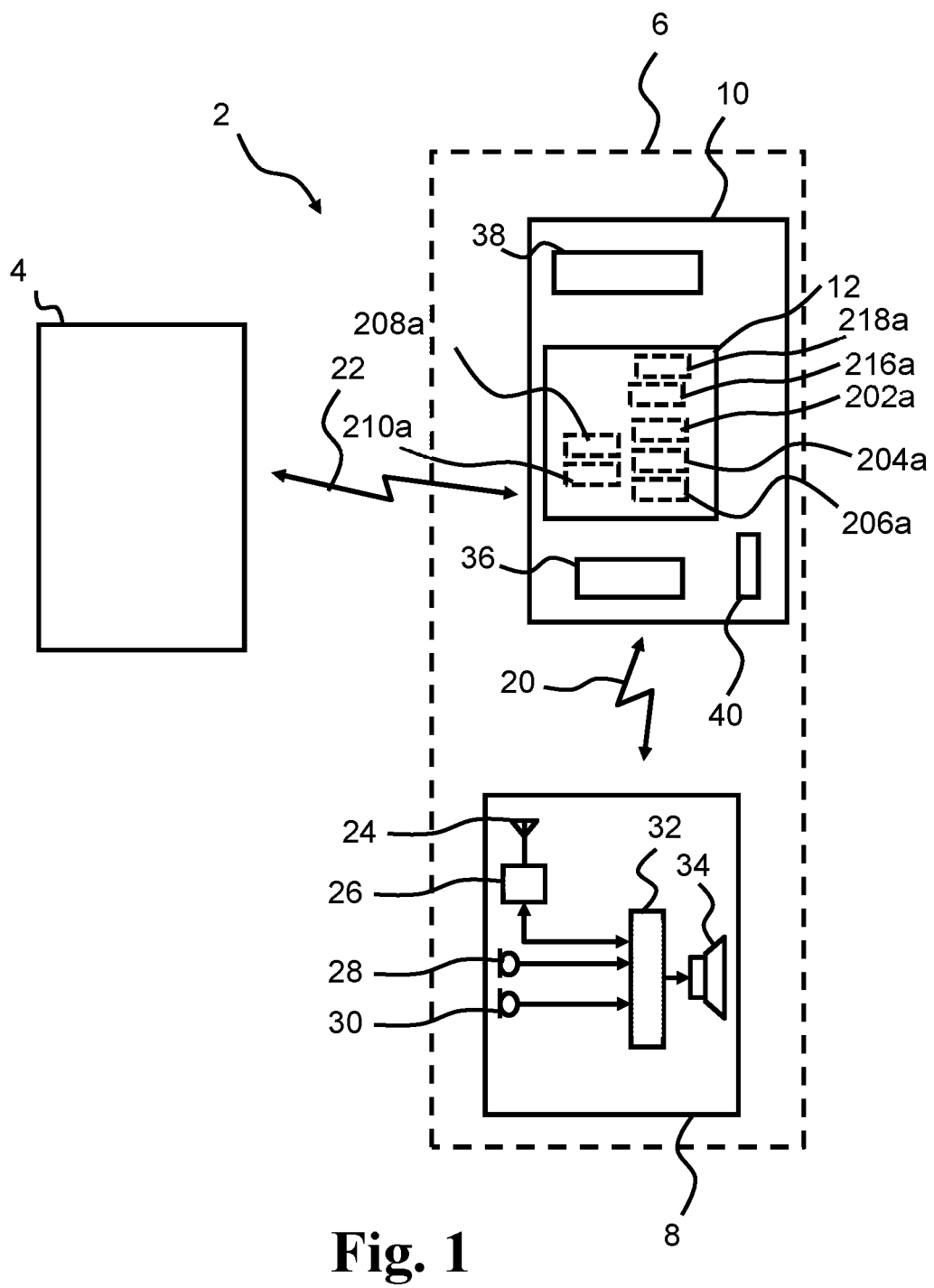
FIG. 1 schematically illustrates a hearing system.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

The present disclosure relates to improved security in hearing system communication, and in particular for communication between a user accessory device having a user application installed thereon and a hearing device. The present disclosure relates to an effective hearing system communication that is robust against replay attacks, unauthorized access, battery exhaustion attacks, and man-in-the-middle attacks.

The present method is intended for use in an initial authentication when a user application for the first time wants to create a connection to a hearing device. It is an advantage of the present disclosure that subsequent pairing is secure and efficient, e.g. can be performed without user interaction.

Approaches to initial wireless authentication between a hearing device and a user application are power cycling and passcode. However, the passcode method requires the user to remember and input a password that is used only once for the pairing, which is cumbersome. And the power cycling method is easy to use, but may be seen as sub-optimal as it might exactly be what the hearing device user would do in case an attacker tries to connect to the hearing device. Thus, these approaches are not optimal in terms of satisfying the following: ease of use, and high level of security, and low level of complexity.

The present disclosure has the advantage that only the hearing device and the user application that communicates wirelessly with the hearing device and at the same time is capable of receiving the sound signal emitted by the hearing device are able to derive the same underlying cryptographic material disclosed below. This present disclosure puts the hearing device user back in control of the initial authentication and of the communication with the hearing device. If an attacker connects wirelessly to the hearing device and want to authenticate, the attacker's user application would not be able to receive the sound signal played as the hearing device emitting the sound signal is wearing the hearing device in question. At the same time, the hearing device user would know that an attacker is trying to connect to the hearing device because the hearing device would suddenly start to play sounds.

The present disclosure is applicable to a hearing device system comprising one or more hearing device, such as a monaural hearing device system, a binaural hearing device system. The user application is configured to create a trusted bond with each of the hearing devices of a binaural hearing device system in a scheduled manner, e.g. one hearing device at a time.

As used herein the term "identifier" refers to a piece of data that is used for identifying, such as for categorizing, and/or uniquely identifying. The identifier may be in a form of a word, a number, a letter, a symbol, a list, an array or any combination thereof. For example, the identifier as a number may be in the form of an integer, such as unsigned integer, uint, with a length of e.g. 8 bits, 16 bits, 32 bits, or more, such as an array of unsigned integers. An identifier may have a length of several bytes. For example, a hearing device identifier may have a length of 20 bytes.

As used herein static string may be a string of characters, such as from 4 to 16 characters, and/or a predefined array of bytes.

A hash function HASH used herein may be any suitable hash function, such as SHA-1, SHA-2, SHA-3, MD5 or other hash functions.

The user accessory device comprises a memory unit and an interface respectively connected to a processing unit. The memory unit may include removable and non-removable data storage units including, but not limited to, Read Only Memory (ROM), Random Access Memory (RAM), etc. The memory unit has a user application stored thereon. The interface comprises an antenna and a wireless transceiver, e.g. configured for wireless communication at frequencies in the range from 2.4 to 2.5 GHz. The interface may be configured for communication, such as wireless communication, with the hearing device comprising an antenna and a wireless transceiver.

The present disclosure relates to easy-to-use, easy-to-deploy, and secure and authenticated pairing between a user accessory device and a hearing device. The user accessory device forms an accessory device to the hearing device.

The hearing device may be a hearing aid, e.g. of the behind-the-ear (BTE) type, in-the-ear (ITE) type, in-the-canal (ITC) type, receiver-in-canal (RIC) type or receiver-in-the-ear (RITE) type. Typically, the hearing device and the user accessory device is in possession of and controlled by the hearing device user.

The methods, user applications and hearing devices disclosed herein create a trusted bond between a hearing device and the user application, thus reducing the complexity of subsequent authentication procedure between the user application and the hearing device. The trusted bond may refer herein to a secure pairing between the hearing device and the user application. The trusted bond ensures or guarantees that it is the hearing device user via the user application that is in control of what the hearing device does. For instance, it should only be the hearing device user that is able to put the hearing device into e.g. a device firmware update mode, and this should only be enabled exactly when the hearing user requests it through the user application. A "trusted bond" is also required to be established for enabling a hearing device to apply remote fine tuning settings to the hearing device via the user application.

The present disclosure relates to a method, performed by a user application, such as at the user application, of creating a trusted bond between a hearing device and the user application.

The method performed by a user application comprises obtaining first authentication material. In one or more exemplary methods, obtaining first authentication material may comprise transmitting a read message to the hearing device and receiving a read response message from the hearing device, the read response message comprising the first authentication material. The first authentication material may comprise a hearing device identifier and/or a first hearing device challenge value.

The method performed by a user application may comprise determining a first common secret based on the first authentication material. The first common secret may be based on the first hearing device challenge value and the hearing device identifier.

The method performed by a user application comprises transmitting a first authentication request comprising a first authentication type identifier and/or first authentication data to the hearing device. The first authentication type identifier is indicative of the type of authentication used in the present authentication, such as the presently disclosed sound-based authentication scheme. Use of a first authentication type identifier facilitates the use of different initial authentication schemes, e.g. as determined by the hearing device. In one or more exemplary methods, the method comprises obtaining security data from the hearing device, and wherein the first authentication type identifier is based on the security data.

The method performed by a user application may comprise determining an application session key and calculating the first authentication data based on the application session key. The method performed by a user application may comprise determining a first authentication data, determining an application session key, e.g. based on the first common secret and/or a static string, and calculating the first authentication data based on the application session key.

In an illustrative example where the present disclosure is applied, the first common secret $CS\_1$ may, e.g. if first authentication type identifier is indicative of the disclosed authentication type, be given as:

$$CS\_1 = HASH(HD\_KEY, HD\_CHALLENGE\_1),$$

wherein HASH is a hash function, HD_KEY is a hearing device key, e.g. based on the hearing device identifier, and HD_CHALLENGE_1 is the first hearing device challenge value.

The hearing device key HD_KEY may be given as:

$$HD\_KEY = HASH(HD\_ID, APP\_KEY),$$

wherein HASH is a hash function, HD_ID is the hearing device identifier, and APP_KEY is keying material stored in the user application. The hearing device key may also be found or stored in the hearing device, thus enabling the hearing device to calculate the first common secret.

The application session key APP_SK may be given as:

$$APP\_SK = HASH(CS\_1, APP\_SK\_STRING),$$

wherein HASH is a hash function, CS_1 is the first common secret and APP_SK_STRING is a static string.

The first authentication data may be based on the first common secret. The method performed by a user application may comprise, e.g. as part of determining the first authentication data, determining an application session key, e.g. based on the first common secret and/or a static string, and calculating the first authentication data based on the application session key.

The first authentication data AD_1 may be generated by applying a hash function to the application session key and/or a static string. For example, the first authentication data AD_1 may be given as:

$$AD\_1 = AES(APP\_SK, APP\_S\_STRING),$$

wherein AES is encryption with AES, APP_SK is the application session key and APP_S_STRING is a static string. Thus, the first authentication data may be generated by encrypting a static string with the application session key based on the first common secret.

The method performed by a user application comprises receiving a first authentication response comprising a sound signal from the hearing device. The sound signal may comprise one or more tones. The sound signal may be generated at the hearing device by emitting one or more tones, such as Dual Tone Multiple Frequencies, DTMF, tones.

The method performed by a user application comprises deriving second authentication material based on the sound signal. In one or more exemplary methods, deriving the second authentication material based on the sound signal comprises deriving a sound value from the received sound signal. The sound value may be derived using a correspondence table where a given number of tones are reflected into a corresponding given sound value provided in e.g. bits or bytes of information. For example, 8 tones may correspond to a 4 bytes sound value. In one or more exemplary methods, deriving the second authentication material based on the sound signal comprises applying a function to the first authentication material and a sound value derived from the sound signal. The function may comprise a one-way function, such as a hash function. A hash function HASH used herein may be any suitable hash function, such as SHA-1, SHA-2, SHA-3, MD5 or other hash functions. For example, the second authentication material may comprise a second common secret CS_2 may, be given as:

$$CS\_2 = \\ HASH(HASH(HD\_KEY, HD\_CHALLENGE\_1), SOUND\_VALUE) \text{ or} \\ CS\_2 = HASH(CS\_1, SOUND\_VALUE),$$

wherein HASH is a hash function, CS_2 denotes the second common secret (which may be seen as an updated first common secret), HD_KEY denotes a hearing device key, e.g. based on the hearing device identifier, HD_CHALLENGE_1 denotes the first hearing device challenge value, SOUND_VALUE denotes a value derived from the received sound signal.

The method performed by the user application comprises determining second authentication data based on the second authentication material. In one or more exemplary methods, determining second authentication data based on the second authentication material comprises deriving a secondary application session key based on the second authentication material and encrypting a value using the secondary application session key. The application session key APP_SK_2 may be given as:

$$APP\_SK\_2 = HASH(CS\_2, APP\_SK\_STRING),$$

wherein HASH is a hash function, CS_2 is the second common secret and APP_SK_STRING is a static string.

The value to be encrypted with the secondary application session key may be a static string, such as a predefined array of bytes. The second authentication data AD_2 may be given as:

$$AD\_2 = AES(APP\_SK\_2, APP\_S\_STRING),$$

wherein AES is encryption with AES, APP_SK_2 is a secondary application session key and APP_S_STRING is a static string. Thus, the second authentication data may be generated by an encrypting a static string with a secondary application session key, e.g. based on a second common secret. The second authentication data may comprise the resulting encrypted static string.

The method performed by the user application comprises transmitting a second authentication request comprising the second authentication data to the hearing device.

The method performed by the user application comprises receiving a second authentication response comprising an authentication key identifier from the hearing device. The method performed by the user application comprises storing an authentication key and the authentication key identifier, wherein the authentication key is based on the first authentication material. The method performed by the user application comprises connecting the user application to the hearing device using the authentication key and the authentication key identifier. For example, connecting the user application to the hearing device using the authentication key and the authentication key identifier comprises connecting the user application to the hearing device via a communication channel secured by the authentication key and the authentication key identifier, e.g. secured using encryption techniques and/or integrity protection technique that make use of the authentication key and the authentication key identifier.

In one or more exemplary methods, the method comprises verifying the second authentication response. The acts of storing authentication key and authentication key identifier and/or connecting the user application to the hearing device using the authentication key and the authentication key identifier may be performed if verifying the second authentication response is successful. Verifying the second authentication response may comprise determining a hearing device session key, e.g. based on the second common secret and/or a static string. The hearing device session key HD_SK may be given as:

$$HD\_SK = HASH(CS\_2, HD\_SK\_STRING),$$

wherein HASH is a hash function, CS_2 is the second common secret and HD_SK_STRING is a static string.

The second authentication response may comprise a hearing device authentication data. Verifying the second authentication response may comprise decrypting the hearing device authentication data using the hearing device session key.

It may be envisaged that connecting the user application to the hearing device may comprise transmitting a first authentication request comprising the authentication key identifier, first authentication data based on the stored authentication key as keying material stored in the user application, and optionally a first authentication type identifier indicative of an authentication type, such as the presently disclosed authentication type.

The method performed by a user application may comprise determining or calculating the authentication key based on the first authentication material. The authentication key may be based on the second authentication material. For example, the second authentication material may comprise a second common secret CS_2 which is derived as:

$$CS\_2 = \\ HASH(HASH(HD\_KEY, HD\_CHALLENGE\_1), SOUND\_VALUE) \text{ or} \\ CS\_2 = HASH(CS\_1, SOUND\_VALUE),$$

wherein HASH is a hash function, CS_2 denotes the second common secret (which may be seen as an updated first common secret), HD_KEY denotes a hearing device key, e.g. based on the hearing device identifier comprised in the first authentication material, HD_CHALLENGE_1 denotes the first hearing device challenge value comprised in the first authentication material, SOUND_VALUE denotes a value derived from the received sound signal.

The authentication key AUTH_KEY may be derived in the following way:

$$AUTH\_KEY = HASH(CS\_2, AUTH\_KEY\_STRING),$$

wherein HASH is a hash function, CS_2 is the second common secret and AUTH_KEY_STRING is a static string.

The method performed by a user application may comprise obtaining security data from the hearing device. The first authentication type identifier may be based on the security data. Thereby is allowed a user application and a hearing device to apply different types of authentication, e.g.

as selected during fitting of the hearing device. The security data from the hearing device may comprise a type identifier indicative of the authentication to be applied in the user application/accepted by the hearing device. The security data may comprise a keying material identifier enabling the user application to verify if the user application supports communication to the hearing device. The security data may be indicative of an authentication type.

The second authentication data may be based on a second common secret. The method performed by a user application may comprise, e.g. as part of determining the second authentication data, calculating the second common secret, determining a secondary application session key, e.g. based on the second common secret and/or a static string.

In one or more exemplary methods, the method performed by a user application may comprise obtaining a public key of the hearing device. The authentication key and/or the first authentication data may be based on the public key of the hearing device. The first common secret may be based on the public key of the hearing device. The public key of the hearing device may be a Diffie-Hellman public key. The method performed by a user application may comprise transmitting a public key of the user application to the hearing device. The first common secret may be based on the public key of the hearing device and the public key of the user application. The first common secret $CS\_1$ may, e.g. if first authentication type identifier is indicative of the disclosed authentication type, be given as:

$$CS\_1 = HASH(HASH(HD\_KEY, HD\_CHALLENGE\_1), DH\_SECRET),$$

wherein HASH is a hash function, HD_KEY is a hearing device key, e.g. based on the hearing device identifier, HD_CHALLENGE_1 is the first hearing device challenge value, and DH_SECRET is the common secret (e.g. shared secret) of the Diffie-Hellman algorithm derived from the public keys of the hearing device and the user application.

The second common secret $CS\_2$ may, e.g. if first authentication type identifier is indicative of authentication type disclosed herein, be given as
$CS\_2=HASH(HASH(HASH(HD\_KEY, HD\_CHAL-LENGE\_1), DH\_SECRET), SOUND\_VALUE)$ or
$CS\_2=HASH(HASH(CS\_1, DH\_SECRET), SOUND\_VALUE)$ or $CS\_2=HASH(CS\_1', SOUND\_VALUE)$ where the first common secret updated with the DH secret: $CS\_1'=HASH(CS\_1, DH\_SECRET)$
wherein HASH is a hashing function, HD_KEY is a hearing device key, e.g. based on the hearing device identifier, HD_CHALLENGE_1 is the first hearing device challenge value, SOUND_VALUE is based on the received sound signal, and DH_SECRET is the common secret of the Diffie-Hellman algorithm derived from the public keys of the hearing device and the user application.

The present disclosure also provides a method, performed at a hearing device, of creating a trusted bond between the hearing device and a user application. The user application may be installed on a user accessory device, such as an accessory device controlled by the hearing device user, e.g. a mobile phone, a tablet, a laptop, and/or a computing device belonging to the hearing device user.

The method performed at a hearing device may comprise transmitting security data of the hearing device to the user application. The security data are optionally indicative of an authentication type applied in the hearing device. Transmitting security data of the hearing device to the user application may for example be in form a transmission of the security data from the hearing device to the user application installed on a user accessory device.

The method performed at a hearing device may comprise connecting the user application to the hearing device using the authentication key and the authentication key identifier.

The method performed at a hearing device comprises transmitting first authentication material to the user application, such as to the user accessory device having the user application installed thereon. The first authentication material may comprise a hearing device identifier and/or a first hearing device challenge value. The method performed at a hearing device may comprise retrieving the hearing device identifier from a memory unit and/or generating the first hearing device challenge value, e.g. as a random or pseudo-random value. The method performed at a hearing device may comprise storing the first hearing device challenge value in the hearing device.

The method performed at a hearing device comprises receiving from the user application (such as from the user accessory device) a first authentication request comprising a first authentication type identifier and/or first authentication data. The first authentication type identifier is indicative of which type of authentication is being used by the user application. The type of authentication may for example comprise passcode-based authentication, power-based authentication, and/or sound-based authentication.

The method performed at a hearing device comprises verifying the first authentication data. Verifying the first authentication data in the hearing device may be based on the first authentication material, e.g. hearing device identifier and/or first hearing device challenge value and/or DH_secret. For example, verifying the first authentication data may be performed by comparing the first authentication data received with authentication data calculated in the hearing device.

The method performed at the hearing device comprises transmitting to the user application a first authentication response comprising a sound signal. In one or more exemplary methods, transmitting the first authentication response comprising a sound signal comprises generating a random sound signal, such as a randomized sound signal. For example, the sound signal may comprise one or more tones, such as randomly selected tones (e.g. DTMF tones). In one or more exemplary methods, transmitting the first authentication response is performed if verifying the first authentication data is successful.

The method performed at the hearing device comprises receiving from the user application a second authentication request comprising second authentication data. The second authentication data may comprise a cipher text encrypted by the user application using a secondary application session key.

The method performed at the hearing device comprises verifying the second authentication data. For example, verifying the second authentication data comprises deriving a secondary application session key based on the sound signal and decrypting the cipher text using the secondary application session key. Deriving the secondary application session key may comprise calculating a second common secret based on a first common secret and a sound value generated to emit or derived from the sound signal, determining a secondary application session key, e.g. based on the second common secret and/or a static string.

The method performed at the hearing device comprises determining and storing an authentication key, e.g. in a temporary memory and/or in authentication key storage in memory unit of the hearing device, if verifying the second authentication data is successful. For example, determining the authentication key may comprise calculating the authentication key based on the first authentication material and/or the sound value. For example, determining the authentication key may comprise determining a second common secret CS_2 which is derived as:

$$CS\_2 = HASH(HASH(HD\_KEY, HD\_CHALLENGE\_1),$$
$$SOUND\_VALUE) \text{ or}$$
$$CS\_2 = HASH(CS\_1, SOUND\_VALUE),$$

wherein HASH is a hash function, CS_2 denotes the second common secret (which may be seen as an updated first common secret), HD_KEY denotes a hearing device key e.g. based on the hearing device identifier comprised in the first authentication material, HD_CHALLENGE_1 denotes the first hearing device challenge value comprised in the first authentication material, SOUND_VALUE denotes a value derived from the received sound signal.

In one or more exemplary methods, determining the authentication key may comprise determining a second common secret CS_2 which is derived as:
CS_2=HASH(HASH(HASH(HD_KEY, HD_CHALLENGE_1), DH_SECRET), SOUND_VALUE)
or
CS_2=HASH(HASH(CS_1, DH_SECRET), SOUND_VALUE) or CS_2=HASH(CS_1', SOUND_VALUE) where the first common secret updated with the DH secret:

$$CS\_1' = HASH(CS\_1, DH\_SECRET)$$

wherein HASH is a hashing function, HD_KEY is a hearing device key, e.g. based on the hearing device identifier, HD_CHALLENGE_1 is the first hearing device challenge value, SOUND_VALUE is based on the received sound signal, and DH_SECRET is the common secret of the Diffie-Hellman algorithm derived from the public keys of the hearing device and the user application.

The authentication key AUTH_KEY may be derived in the following way:

$$AUTH\_KEY = HASH(CS\_2, AUTH\_KEY\_STRING),$$

wherein HASH is a hash function, CS_2 is the second common secret and AUTH_KEY_STRING is a static string.

The method performed at the hearing device comprises transmitting to the user application a second authentication response if verifying the second authentication data is successful. The second authentication response may comprise an authentication key identifier indicative of the authentication key in the hearing device and optionally hearing device authentication data. The hearing device authentication data HD_AD may be given as:

$$HD\_AD = AES(HD\_SK, HD\_S\_STRING),$$

wherein AES is encryption with AES, HD_SK is the hearing device session key based on the second common secret CS_2, and HD_S_STRING is a static string.

The hearing device session key HD_SK is given as:

$$HD\_SK = HASH(CS\_2, HD\_SK\_STRING),$$

wherein HASH is a hash function, such as SHA-2, CS_2 is the second common secret and HD_SK_STRING is a static string.

Thus, the hearing device authentication data may be generated by encrypting a static string with the hearing device session key based on the second common secret.

Features described in relation to the method performed by a user application may also be applied in the method performed at a hearing device. In particular, calculation of common secrets for verification of authentication data are preferably performed the same way in both the hearing device and the user application.

The present disclosure also relates to a user application for a user accessory device. The user accessory device may be a computing device, such as a portable computing, such as a mobile phone, a smartphone, a smartwatch or a tablet computer. The user application is, when installed on the user accessory device, configured to create a trusted bond between a hearing device and the user application.

The present methods and devices enables simple and secure connections between a hearing device and a user application after an initial creation of a trusted bond as disclosed herein. Accordingly, processing-heavy authentication or cumbersome procedures may be avoided or at least heavily reduced after the trusted bond has been created.

Namely, the methods, user applications and hearing devices disclosed herein enable hearing system communication that is robust against security threats, vulnerabilities and attacks by implementing appropriate safeguards and countermeasures, such as security mechanisms, to protect against threats and attacks.

Throughout, the same reference numerals are used for identical or corresponding parts.

FIG. 1 shows an exemplary hearing system. The hearing system 2 comprises a server device 4 and a hearing device system 6 comprising a hearing device 8 and a user accessory device 10. The user accessory device 10 may be a smartphone configured to wirelessly communicate with the hearing device 8. A user application 12 is installed on the user accessory device 10, such as on the memory unit 38 and/or processing unit 36. The user application may be for controlling the hearing device 8 and/or assisting a hearing device user. In one or more exemplary user applications, the user application 12 is configured to transfer firmware and/or hearing device settings to the hearing device. In one or more exemplary user applications, the user application 12 is configured to control operating parameters, such as volume, program, etc., of the hearing device The hearing device 8 may be configured to compensate for hearing loss of a user of the hearing device 8. The hearing device 8 is configured to configured to communicate with the user accessory device 10/user application 12, e.g. using a wireless and/or wired first communication link 20. The first communication link 20 may be a single hop communication link or a multi-hop communication link. The first communication link 20 may be carried over a short-range communication system, such as Bluetooth, Bluetooth low energy, IEEE 802.11 and/or Zigbee.

The hearing device 8 comprises an interface including an antenna 24 and a radio transceiver 26 coupled to the antenna 24 for receiving/transmitting wireless communication including first communication link 20. The hearing device 8 comprises a set of microphones comprising a first microphone 28 and optionally a second microphone 30 for provision of respective first and second microphone input signals. The hearing device 8 may be a single-microphone hearing device. The hearing device 8 comprises a memory unit (not shown) connected to the processing unit 32. The hearing device 8 comprises a processing unit 32 connected to the transceiver 26 and microphones 28, 30 for receiving and processing input signals. The processing unit 32 is configured to compensate for a hearing loss of a user based on hearing device settings and to provide an electrical output signal based on the input signals. A receiver 34 converts the electrical output signal to an audio output signal to be directed towards an eardrum of the hearing device user. The receiver 34 is configured to emit sound signals, such as sounds, according to the present disclosure.

The user accessory device 10 comprises a processing unit 36, a memory unit 38, an interface 40. The user application 12 is installed in the memory unit 38 of the user accessory device 10 and, when running on the user accessory device, configured to obtain first authentication material, e.g. with obtain module 202a; transmit to the hearing device 8 a first authentication request comprising a first authentication type identifier and first authentication data to the hearing device 8, e.g. with transmit module 204a; receive from the hearing device 8 a first authentication response comprising a sound signal, e.g. with receive module 206a; derive second authentication material based on the sound signal, e.g. with derive module 208a; determine second authentication data based on the second authentication material, e.g. with determine module 210a; transmit a second authentication request comprising the second authentication data to the hearing device 8, e.g. via transmit module 204a; receive from the hearing device 8 a second authentication response comprising an authentication key identifier, with e.g. receive module 206a; store an authentication key and the authentication key identifier, e.g. with storing module 216a, wherein the authentication key is based on the first authentication material; and connect the user application 12 or the user accessory device 10 to the hearing device 8 using the authentication key and the authentication key identifier, e.g. with connecting module 218a. The connecting module 218a may also be used for connecting with the server device 4, e.g. in via second communication link 22.

Figure 2:
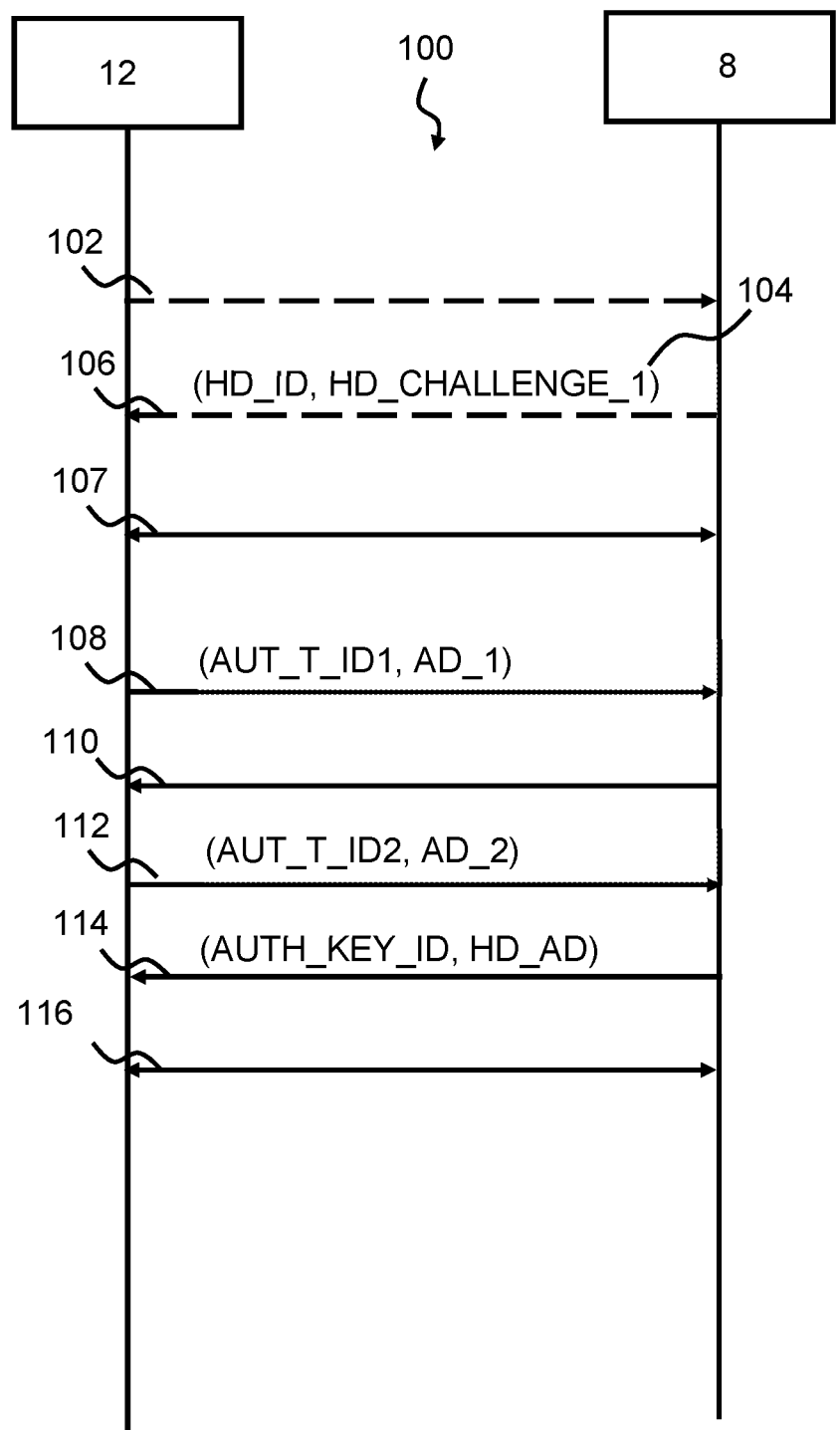
FIG. 2 shows an exemplary signaling diagram of signaling between a user application and a hearing device.

FIG. 2 shows an exemplary signaling diagram 100 between a user application 12 and a hearing device 8 illustrating exemplary methods of creating a trusted bond between a hearing device 8 and the user application 12.

The user application 12 obtains first authentication material including a hearing device identifier HD_ID and a first hearing device challenge value HD_CHALLENGE_1, e.g., by transmitting a read message 102 to the hearing device 8. The hearing device 8 generates the first hearing device challenge value, stores the first hearing device challenge value in the memory unit of the hearing device 8, and transmits the first authentication material 104 to the user application 12 in a read response message 106 in response to receiving the read message 102 from the user application 12.

Further, the user application and the hearing device exchange public keys for the Diffie-Hellmann algorithm by key exchange signalling 107. In one or more exemplary methods, the key exchange signalling 107 may be omitted.

The user application 12 determines first authentication data AD_1 and transmits a first authentication type identifier AUT_T_ID1 and the first authentication data AD_1 to the hearing device in a first authentication request 108. The first authentication type identifier AUT_T_ID1 is in first authentication request 108 indicative of an authentication type to be carried out subsequently. The first authentication data AD_1 are given by:

$$AD\_1 = AES\_COUNTER(APP\_SK, APP\_S\_STRING),$$

wherein AES_COUNTER is encryption with AES in counter mode and APP_S_STRING is a static string.

APP_SK is an application session key and given as:

$$APP\_SK = HASH(CS\_1, APP\_SK\_STRING),$$

wherein HASH is a hash function, such as SHA-2, and APP_SK_STRING is a static string.

CS_1 is a first common secret and is given as:

$$CS\_1 = HASH(HASH(HD\_KEY, HD\_CHALLENGE\_1), DH\_SECRET),$$

wherein HASH is a hash function, such as SHA-2, HD_KEY is a hearing device key, HD_CHALLENGE_1 is the first hearing device challenge value, and DH_SECRET is the common secret of the Diffie-Hellman algorithm derived from the public keys of the hearing device and the user application during key exchange signalling 107. The two hash functions used for determining CS_1 may be the same or different hash function.

HD_KEY is a hearing device key based on the hearing device identifier and given as:

$$HD\_KEY = HASH(HD\_ID, APP\_KEY),$$

wherein HASH is a hash function, HD_ID is the hearing device identifier, and APP_KEY is keying material stored in the user application.

The hearing device 8 receives the first authentication request 108 and verifies the first authentication data AD_1 by decrypting AD_1 with an application session key. If the hearing device 8 successfully verifies the first authentication data and optionally accepts the authentication type indicated by the authentication type identifier, the hearing device 8 transmits a first authentication response 110 by emitting a sound signal comprising one or more tones. Prior to emitting the sound signal, the hearing device 8 generates a sound value (e.g. randomly) and selects the one or more tones based on the sound value.

The user application 12 receives the first authentication response 110 from the hearing device 8 and derives second authentication material based on the first authentication response 110, such as based on the sound signal, such as by calculating a second common secret. For example, the second authentication material may comprise a second common secret CS_2 may, be given as:

$$CS\_2 = \text{HASH}(\text{HASH}(\text{HD\_KEY}, \text{HD\_CHALLENGE\_1}), \text{SOUND\_VALUE}) \text{ or}$$

$$CS\_2 = \text{HASH}(CS\_1, \text{SOUND\_VALUE}),$$

wherein HASH is a hash function, CS_2 denotes the second common secret (which may be seen as an updated first common secret), HD_KEY denotes a hearing device key, e.g. based on the hearing device identifier, HD_CHALLENGE_1 denotes the first hearing device challenge value, SOUND_VALUE denotes a value derived from the received sound signal.

The user application 12 determines second authentication data based on the second authentication material by deriving a secondary application session key based on the second authentication material and encrypting a value using the secondary application session key. The application session key APP_SK_2 may be given as:

$$\text{APP\_SK\_2} = \text{HASH}(CS\_2, \text{APP\_SK\_STRING}),$$

wherein HASH is a hash function, CS_2 is the second common secret and APP_SK_STRING is a static string.

The value to be encrypted with the secondary application session key may be a static string, such as a predefined array of bytes. The second authentication data AD_2 may be given as:

$$AD\_2 = AES(\text{APP\_SK\_2}, \text{APP\_S\_STRING}),$$

wherein AES is encryption with AES, APP_SK_2 is a secondary application session key and APP_S_STRING is a static string.

The user application 12 transmits a second authentication request 112 comprising the second authentication data AD_2 and the second authentication type identifier AUT_T_ID2 indicative of the authentication type to be carried out subsequently.

The hearing device 8 receives the second authentication request 112 comprising the second authentication data AD_2 and the second authentication type identifier AUT_T_ID2.

The hearing device 8 verifies the second authentication data AD_2 by decrypting AD_2 with a secondary application session key. If the hearing device 8 successfully verifies the second authentication data AD_2, the hearing device stores the authentication key from temporary memory in authentication key storage in memory unit of the hearing device with an associated authentication key identifier AUTH_KEY_ID, determines hearing device authentication data based on the second common secret CS_2, and transmits a second authentication response 114 comprising hearing device authentication data HD_AD and the authentication key identifier AUTH_KEY_ID to the user application 12. The hearing device authentication data HD_AD is given as:

$$\text{HD\_AD} = \text{AES\_COUNTER}(\text{HD\_SK}, \text{HD\_S\_STRING}),$$

wherein AES_COUNTER is encryption with AES in counter mode, HD_SK is the hearing device session key based on the second common secret CS_2, and HD_S_STRING is a static string.

The secondary hearing device session key HD_SK is given as:

$$\text{HD\_SK} = \text{HASH}(CS\_2, \text{HD\_SK\_STRING}),$$

wherein HASH is a hash function, such as SHA-2, CS_2 is the second common secret and HD_SK_STRING is a static string.

Thus, the hearing device authentication data may be generated by encrypting a static string with the hearing device session key based on the second common secret.

The user application 12 receives the second authentication response 114. The user application 12 may verify the hearing device authentication data HD_AD comprised in the second authentication response by decrypting the hearing device authentication data HD_AD and by comparing the decryption result and the authentication data calculated in the user application based on the second common secret. If verifying the second authentication response is successful, the user application 12 calculates the authentication key AUTH_KEY (if not calculated earlier) and stores the authentication key and the authentication key identifier AUTH_KEY_ID from the second authentication response 114 and connects by connection signalling 116 to the hearing device using the authentication key AUTH_KEY and the authentication key identifier AUTH_KEY_ID.

Figure 3:
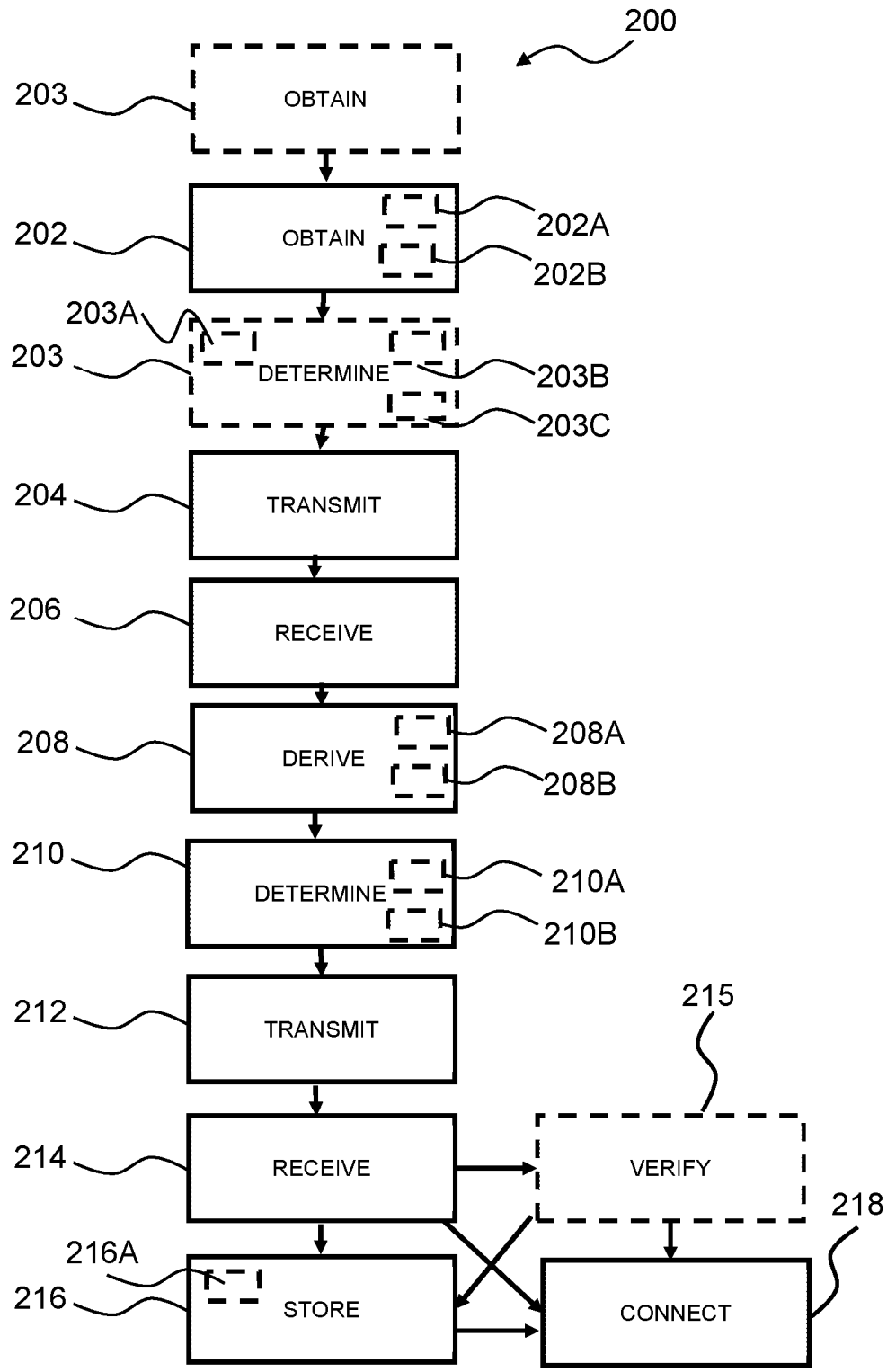
FIG. 3 is a flow diagram of an exemplary method according to the disclosure.

FIG. 3 illustrates an exemplary method performed by a user application of creating a trusted bond between a hearing device and the user application. The method 200 comprises obtaining 202 first authentication material, the first authentication material comprising a hearing device identifier and a first hearing device challenge value. In one or more exemplary methods, obtaining 202 first authentication material may comprise transmitting 202A a read message to the hearing device and receiving 202B a read response message from the hearing device, the read response message comprising the first authentication material.

The method 200 optionally comprises obtaining 203 security data of the hearing device, the security data comprising a type identifier indicative of the authentication to be applied in the user application, and optionally a keying material identifier enabling the user application to verify if the user application supports communication to the hearing device. The method 200 may comprise determining 203A a first common secret based on the first authentication material to determine the first authentication data. The first common secret may be based on the first hearing device challenge value and the hearing device identifier. Determining 203A first common secret optionally comprises determining 203B the first authentication data based on the first common secret, e.g. as described in relation to FIG. 2. Determining 203A first common secret optionally comprises determining 203C, e.g. as part of 203B, an application session key, e.g. based on the first common secret, and optionally calculating the first authentication data based on the application session key. The first authentication request comprises the first authentication type identifier e.g. based on the security data obtained in 203.

The method 200 proceeds to transmitting 204 a first authentication request comprising a first authentication type identifier and the first authentication data to the hearing device The method 200 comprises receiving 206 from the hearing device a first authentication response comprising a sound signal from the hearing device.

The method 200 comprises deriving 208 second authentication material based on the sound signal. In one or more exemplary methods, deriving 208 the second authentication material based on the sound signal comprises deriving 208A a sound value from the received sound signal. In one or more exemplary methods, deriving 208 the second authentication material based on the sound signal comprises applying 208B a function to the first authentication material and a sound value derived from the sound signal. The function may comprise a one-way function, such as a hash function. A hash function HASH used herein may be any suitable hash function, such as SHA-1, SHA-2, SHA-3, MD5 or other hash functions.

The method 200 comprises determining 210 second authentication data based on the second authentication material. In one or more exemplary methods, determining 210 second authentication data based on the second authentication material comprises deriving 210A a secondary application session key based on the second authentication material and encrypting 210B a value using the secondary application session key.

The method 200 comprises transmitting 212 a second authentication request comprising the second authentication data to the hearing device.

The method 200 comprises receiving 214 a second authentication response comprising an authentication key identifier from the hearing device. The method 200 comprises storing 216 an authentication key and the authentication key identifier, wherein the authentication key is based on the first authentication material. The method 200 comprises connecting 218 the user application to the hearing device using the authentication key and the authentication key identifier. For example, connecting 218 the user application to the hearing device using the authentication key and the authentication key identifier comprises connecting the user application to the hearing device via a communication channel secured by the authentication key and the authentication key identifier, e.g. secured using encryption techniques and/or integrity protection technique that make use of the authentication key and the authentication key identifier.

In one or more exemplary methods, the method comprises verifying 215 the second authentication response. The acts of storing 216 authentication key and authentication key identifier and/or connecting 218 the user application to the hearing device using the authentication key and the authentication key identifier may be performed if verifying the second authentication response is successful.

The method 200 may comprises calculating the authentication key based on the first authentication material and/or the second authentication material. The method may comprise obtaining a public key of the hearing device. In one or more exemplary methods, obtaining a public key of the hearing device may be performed before or after obtaining 202 first authentication material. Determining first authentication data may be based on public keys of the hearing device and the user application, e.g. using a Diffie-Helmann scheme as described earlier.

Figure 4:
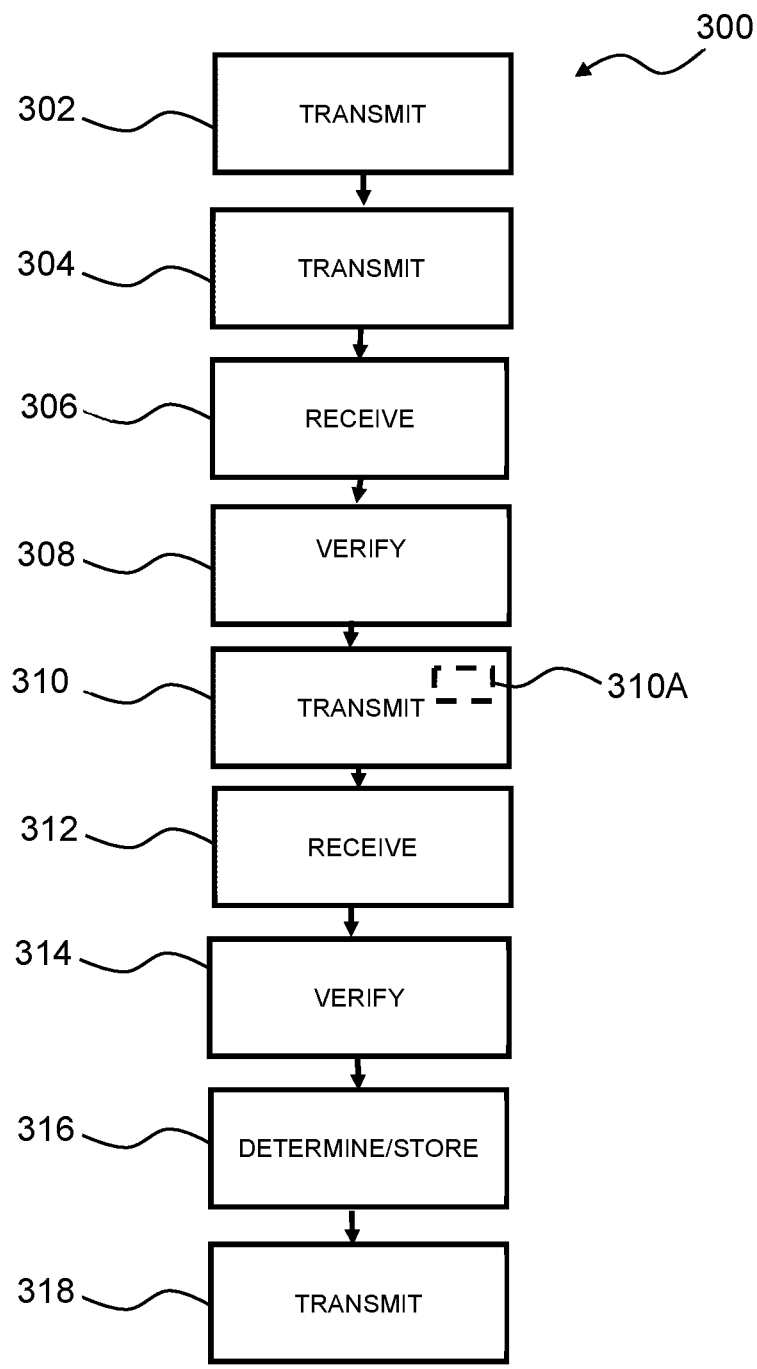
FIG. 4 is a flow diagram of an exemplary method according to the disclosure.

FIG. 4 illustrates an exemplary method performed at a hearing device of creating a trusted bond between the hearing device and a user application. The method 300 comprises transmitting 302 security data of the hearing device to the user application, wherein the security data are indicative of an authentication type applied in the hearing device; and transmitting 304 first authentication material. The first authentication material may comprise a hearing device identifier and a first hearing device challenge value. The method 300 comprises receiving 306, from the user application, a first authentication request comprising a first authentication type identifier and first authentication data. The method 300 comprises verifying 308 the first authentication data and/or first authentication type identifier.

The method 300 comprises transmitting 310 to the user application a first authentication response comprising a sound signal. In one or more exemplary methods, transmitting 310 the first authentication response comprising a sound signal comprises generating 310A a random sound signal, such as a randomized sound signal. For example, the sound signal may comprise one or more tones, such as randomly selected tones (e.g., DTMF tones). In one or more exemplary methods, transmitting 310 the first authentication response is performed if verifying the first authentication data is successful.

The method 300 comprises receiving 312 from the user application a second authentication request comprising second authentication data. The second authentication data may comprise a cipher text encrypted by the user application using a secondary application session key.

The method 300 comprises verifying 314 the second authentication data. For example, verifying 314 the second authentication data comprises deriving a secondary application session key based on the sound signal and decrypting the cipher text using the secondary application session key. Deriving the secondary application session key may comprise calculating a second common secret based on a first common secret and a sound value generated to emit or derived from the sound signal, determining a secondary application session key, e.g. based on the second common secret and/or a static string.

The method 300 comprises determining and storing 316 an authentication key, e.g., in a temporary memory and/or in authentication key storage in memory unit of the hearing device, if verifying the second authentication data is successful. For example, determining the authentication key may comprise calculating the authentication key based on the first authentication material and/or the sound value.

The method 300 comprises transmitting 318 to the user application a second authentication response if verifying the second authentication data is successful. The second authentication response may comprise an authentication key identifier indicative of the authentication key in the hearing device and optionally hearing device authentication data.

Figure 5:
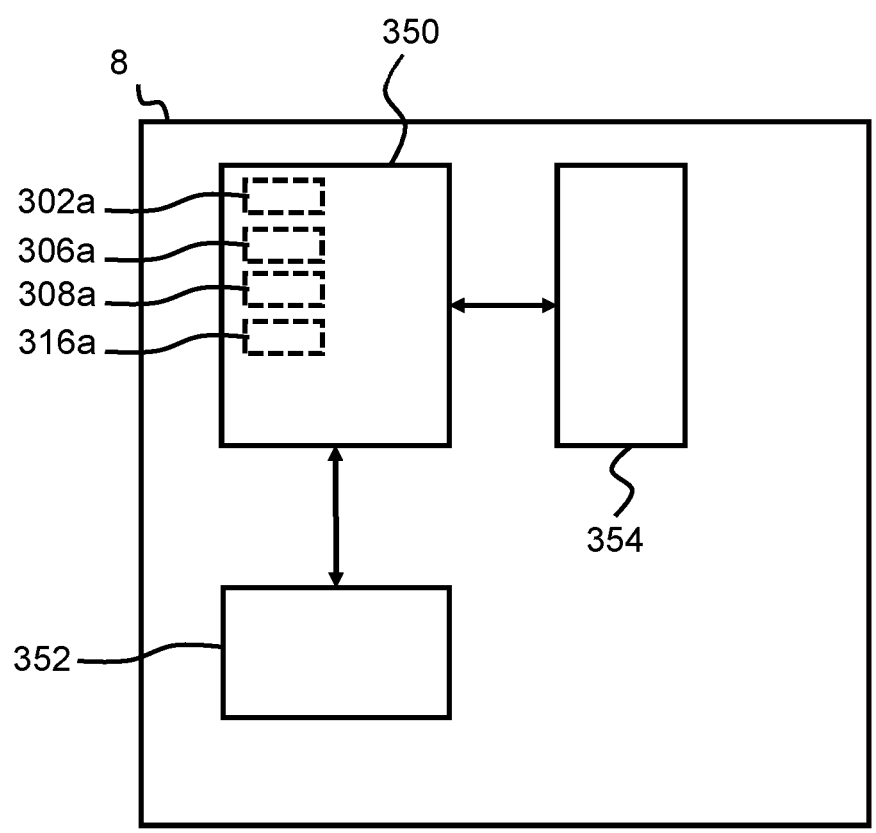
FIG. 5 schematically illustrates an exemplary hearing device.

FIG. 5 shows an exemplary hearing device. The hearing device 8 comprises a processing unit 350 including a transmit module 302a, a receive module 306a, a verification module 308a, and a determine and store module 316a. Further, the hearing device comprises a memory unit 352 and an interface 354, wherein the hearing device 8 is configured to transmit first authentication material, e.g. with transmit module 302a; receive a first authentication request comprising a first authentication type identifier and first authentication data, e.g. with receive module 306a; verify the first authentication data, e.g. with verification module 306a; transmit to the user application an first authentication response comprising a sound signal, e.g. with transmit module 302a; receive from the user application a second authentication request comprising second authentication data, e.g. with receive module 306a; verify the second authentication data, e.g. with verification module 306a; determine and store an authentication key, e.g. with determine and store module 308, if verifying the first authentication data is successful; and transmit to the user application a second authentication response comprising an authentication key identifier indicative of the authentication key in the hearing device, e.g. with transmit module 302a, if verifying the second authentication data is successful.

The hearing device 8 may be arranged to execute at least parts of methods as disclosed herein. The processing unit 350 may further comprise a number of optional functional modules, such as any of a transmit module 302a configured to perform any of steps 302, 304, 310, and 318, a receive module 306a configured to perform step 306 and 312, verification module 308a configured to perform step 308 and 314, and determine and store module 316a configured to perform step 316. In general terms, each functional module may be implemented in hardware and/or in software.

The use of the terms "first", "second", "third" and "fourth", etc. does not imply any order, but are included to identify individual elements. Moreover, the use of the terms first, second, etc. does not denote any order or importance, but rather the terms first, second, etc. are used to distinguish one element from another. Note that the words first and second are used here and elsewhere for labelling purposes only and are not intended to denote any specific spatial or temporal ordering. Furthermore, the labelling of a first element does not imply the presence of a second element and vice versa.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications, and equivalents.

LIST OF REFERENCES 2 hearing system
4 server device
6 hearing device system
8 hearing device
10 user accessory device
12 user application
20 first communication link
22 second communication link
24 antenna
26 radio transceiver
28 first microphone
30 second microphone
32 processing unit
34 receiver
36 processing unit
38 memory unit
40 interface
100 signalling diagram
102 read message
104 first authentication data
106 read response message
107 key exchange signalling
108 first authentication request
110 first authentication response
112 second authentication request
114 second authentication response
116 connection signalling
200 method of creating a trusted bond between hearing device and user application
202 obtaining first authentication material
202a obtain module
202A transmitting a read message to the hearing device
202B receiving a read response message from the hearing device
203 obtaining security data
203A determining first common secret
203B determining a first authentication data
203C determining an application session key and calculating the first authentication data based on the application session key
204 transmitting first authentication request
204a transmit module
206 receiving a first authentication response
206a receive module
208 deriving second authentication material
208a derive module
208A deriving a sound value
208B applying a function
210 determining second authentication data
210a determine module
210A deriving a secondary application session key
210B encrypting
212 transmitting a second authentication request
214 receiving a second authentication response
215 verify
216 storing an authentication key and the authentication key identifier
216a storing module
216A calculating an authentication key
218 connecting
218a connect module
300 Method performed at a hearing device of creating a trusted bond between hearing device and user application
302 transmitting security data
302a transmit module
304 transmitting first authentication material
306 receiving first authentication request
306a receive module
308 verifying the first authentication data and/or first authentication type identifier
308a verification module
310 transmitting a first authentication response
310A generating random sound signal
312 receiving second authentication request
314 verifying second authentication data
316 determining and storing authentication key
316a determine and store module
318 transmitting to the user application a second authentication response
350 processing unit
352 memory unit
354 interface

The invention claimed is:
1. A hearing device comprising:
a processing unit;
a memory unit coupled to the processing unit; and
an interface coupled to the processing unit;
wherein the hearing device is configured to:
transmit security data of the hearing device to a user device;
transmit first authentication material to the user device, wherein the security data is separate from the first authentication material;
receive from the user device a first authentication request comprising first authentication data;

verify the first authentication data using the processing unit of the hearing device; and wirelessly transmit a first authentication response to the user device via an antenna of the hearing device, wherein the first authentication response comprises a random sound signal.

2. The hearing device according to claim 1, wherein the sound signal comprises a tone.

3. The hearing device according to claim 2, wherein the tone is a random tone.

4. The hearing device according to claim 1, wherein the hearing device is further configured to:

receive from the user device a second authentication request comprising second authentication data; and
verify the second authentication data.

5. The hearing device of claim 1, wherein the hearing device is configured to transmit the security data and the first authentication material in separate transmissions.

6. The hearing device of claim 1, wherein the random sound signal comprises a randomly selected tone.

7. The hearing device of claim 1, wherein the security data is indicative of an authentication type.

8. The hearing device of claim 1, wherein the first authentication material comprises a hearing device identifier.

9. A hearing device comprising:
a processing unit;
a memory unit coupled to the processing unit; and
an interface coupled to the processing unit;
wherein the hearing device is configured to:
transmit security data of the hearing device to a user device;
transmit first authentication material to the user device, wherein the security data is separate from the first authentication material;
receive from the user device a first authentication request comprising first authentication data;
verify the first authentication data using the processing unit of the hearing device;
wirelessly transmit a first authentication response to the user device via an antenna of the hearing device, wherein the first authentication response comprises a sound signal;
receive from the user device a second authentication request comprising second authentication data; and
verify the second authentication data;
wherein the hearing device is further configured to determine an authentication key if the second authentication data is successfully verified.

10. The hearing device according to claim 9, wherein the hearing device is further configured to transmit to the user device a second authentication response comprising an authentication key identifier indicative of the authentication key if the second authentication data is successfully verified.

11. The hearing device of claim 9, wherein the first authentication material comprises a hearing device identifier.

12. A method performed by a hearing device, the method comprising:
transmitting security data of the hearing device to a user device;
transmitting first authentication material to the user device, wherein the security data is separate from the first authentication material;
receiving from the user device a first authentication request comprising first authentication data;
verifying the first authentication data using a processing unit of the hearing device; and
wirelessly transmitting, by an antenna of the hearing device, a first authentication response to the user device, the first authentication response comprising a random sound signal.

13. The method according to claim 12, wherein the sound signal is transmitted by the hearing device as at least a part of the first authentication response after the first authentication request is received by the hearing device.

14. The method according to claim 13, wherein the sound signal comprises a tone.

15. The method according to claim 14, wherein the tone is a random tone.

16. The method according to claim 12, further comprising:

receiving from the user device a second authentication request comprising second authentication data; and
verifying the second authentication data.

17. The method of claim 12, wherein the security data and the first authentication material are transmitted in separate transmissions.

18. The method of claim 12, wherein the random sound signal comprises a randomly selected tone.

19. The method of claim 12, wherein the security data is indicative of an authentication type.

20. The method of claim 12, wherein the first authentication material comprises a hearing device identifier.

21. The method according to claim 12, wherein the first authentication response is transmitted if the first authentication data is successfully verified.

22. A method of communication with a hearing device, the method comprising:
transmitting, by a user device, a first authentication request comprising first authentication data to the hearing device;
receiving, by the user device, a first authentication response;
determining, by the user device, authentication material based on the first authentication response;
determining, by the user device, second authentication data based on the authentication material; and
transmitting, by an antenna of the user device, a second authentication request comprising the second authentication data to the hearing device;
wherein the first authentication response comprises a sound signal provided by the hearing device; and
wherein the sound signal from the hearing device is received by the user device as at least a part of the first authentication response, after the first authentication request is transmitted by the user device.

23. The method according to claim 22, further comprising receiving a hearing device identifier and/or a first hearing device challenge value.

24. The method according to claim 23, further comprising determining a first common secret based on the hearing device identifier and/or the first hearing device challenge value.

25. The method according to claim 22, further comprising:
determining an application session key; and
calculating the first authentication data based on the application session key.

26. The method according to claim 22, further comprising obtaining an authentication key.

27. The method according to claim 26, further comprising connecting the user device to the hearing device using the authentication key.

28. The method according to claim 26, wherein the act of obtaining the authentication key comprises calculating the authentication key.

29. A method of communication with a hearing device, the method comprising:
- transmitting, by a user device, a first authentication request comprising first authentication data to the hearing device;
- receiving, by the user device, a first authentication response;
- determining, by the user device, authentication material based on the first authentication response;
- determining, by the user device, second authentication data based on the authentication material;
- transmitting, by an antenna of the user device, a second authentication request comprising the second authentication data to the hearing device;
- obtaining a public key of the hearing device; and
- obtaining an authentication key, wherein the authentication key is based on the public key of the hearing device.

30. The method according to claim 22, further comprising obtaining security data from the hearing device.

* * * * *